July 12, 1949.  C. W. WANDREY  2,475,730
PROJECTILE OFFSET
Filed Sept. 3, 1946
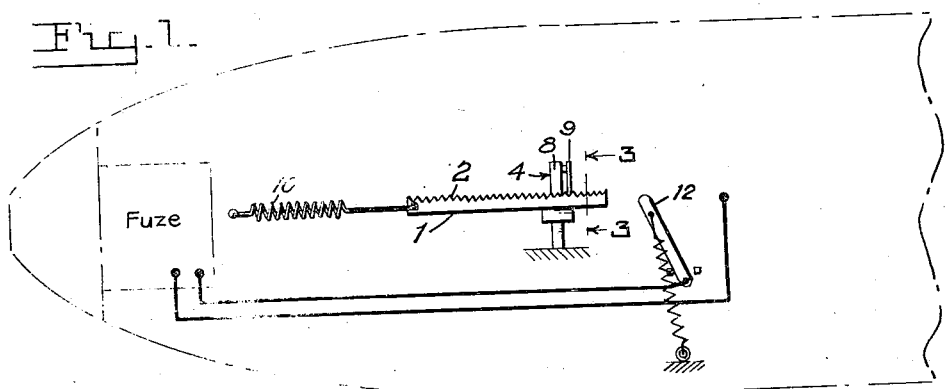
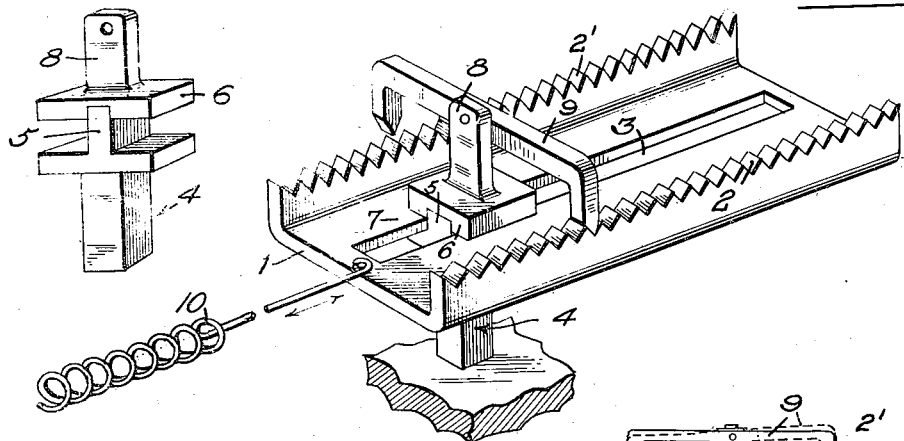
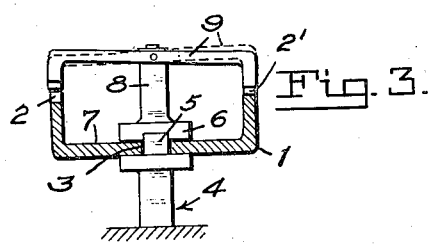
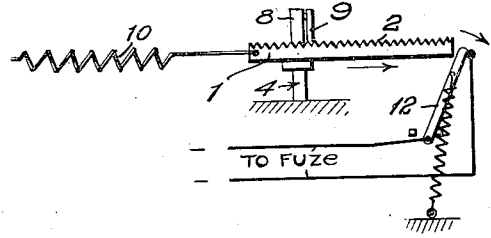
Inventor
Clarence W. Wandrey
By J. H. Church & W. E. Thibodeau
Attorney Patented July 12, 1949

2,475,730

UNITED STATES PATENT OFFICE 2,475,730

PROJECTILE OFFSET

Clarence W. Wandrey, Wheaton, Ill., assignor to the United States of America as represented by the Secretary of War Application September 3, 1946, Serial No. 694,490

3 Claims. (Cl. 161—1)

This invention relates to a motion-retarding device and has for its principal object the provision of a device for retarding motion of a movable member subject to a force.

Another object is to provide a simple and rugged mechanical device having a minimum number of parts for replacing the well-known pneumatic or hydraulic dash pot. A particular object is to provide means for producing a control function which requires the application of a predetermined minimum force to a mechanical member for a predetermined minimum interval of time.

Other objects will become apparent as the description of my invention proceeds.

There are many mechanical applications in which a force is required to produce a desired effect, not immediately, but after the lapse of a definite time interval. One example of this is a delayed arming mechanism for ordnance missiles where for reasons of safety it is desired that the missile be armed only after it has been fired (or launched in the case of a rocket) and has proceeded a safe distance from its starting point. To accomplish this various devices are employed which may be made to function by the forces acting on the missile during acceleration to its maximum velocity. To prevent accidental arming due to a fall or to any shock resulting from careless handling it is desirable that the action of the force required to arm the missile be of the same order of magnitude and duration as when he missile is fired.

My invention provides a simple, small and rugged device suitable for this purpose. Specifically, my invention consists of an inertia member in the form of a linear toothed member cooperating with an escapement member such as a pivoted double pawl whose ends or pallets alternately engage the teeth of the inertia member when the latter is subjected to a force which is transmitted to the escapement member.

In the figures:

Figure 1 is a schematic view of the nose of a projectile embodying my invention, showing the device in its initial state, Figure 2 is a perspective view of the inertia element, showing it displaced from its initial position, Figure 3 is a view in partial cross-section taken on line 3—3 of Figure 1, Figure 4 is a view showing the inertia element of Figure 1 displaced to its extreme position under acceleration, Figure 5 is a detailed view of the guide and pawl supporting element.

Inertia member 1, having teeth 2, 2' is provided with a slot 3. Guide 4 has an extension 5 extending through slot 3, and has shoulders 6 engaging the upper surface 7 of member 1. Member 1 is thus restrained by the guide from any motion except linear axial motion in the direction of slot 3. Post 8 is suitably fastened to or integral with extension 5 and pivotally supports escapement 9 for alternative engagement with teeth 2 or 2'. Spring 10 restrains member 1 to the position shown in Figure 1.

If the device is accelerated to the left as shown in Figure 4, the force of acceleration tends to move inertia member 1 to the right relative to guide 4. If this force is sufficiently great to overcome the force of spring 10, member 1 will act upon escapement 9, causing it to alternately engage teeth 2, 2', thus slowing the action of member 1 in a manner similar to that of the well-known clock escapement. If the acceleration continues until member 1 approaches the end of its possible travel the member acts upon the control device represented by over-center lever 12 to throw same to the operative position. This may close a circuit if the device is electrically controlled or may trip a latch if the device is mechanically controlled, but in either case it will be designed to arm the missile so that it will be effective to function upon its target in the desired manner, as by contact therewith, by time control or by electrical control.

It will be readily apparent that my invention functions to retard and delay linear motion in either of two directions as does the well-known hydraulic dash pot, and could be used to replace such dash pots in many of the present uses of the latter, as in door checks for preventing doors from slamming, etc. Many other uses will suggest themselves to those skilled in the art.

When used as a delay arming device as shown in the figures it will be apparent that any shock or force of insufficient duration to arm the device will cause the inertia member 1 to move against the action of spring 10 an insufficient distance to actuate control device 12. Upon cessation of such force the spring 10 will return the inertia member to its initial position so that successive shocks such as might result from dropping or careless handling of the missile will neither arm the device nor effect its predetermined arming time.

I claim:

1. A motion-retarding device comprising an elongated member having two parallel rows of teeth axially thereof, fixed guide means engaging said member to permit only limited axial motion thereof, a double-pallet escapement pawl pivotally mounted at a point fixed with respect to said guide so that each pallet will engage successive teeth of one of said two parallel rows of teeth upon axial movement of said elongated member with respect to said guide, to retard but not to stop movement of said elongated member.

2. The invention as recited in claim 1 and comprising spring means for retaining said axially movable member in one extreme position thereof.

3. The invention as recited in claim 1 and comprising a control device so positioned with respect to said axially movable member as to be actuated thereby in one extreme position of said member.

CLARENCE W. WANDREY.

REFERENCES CITED

The following references are of record in the file of this patent:

UNITED STATES PATENTS

| Number | Name | Date |
|---|---|---|
| 455,364 | Shaw | July 7, 1891 |
| 1,260,801 | Pukerud | Mar. 26, 1918 |
| 1,726,325 | Varaud | Aug. 27, 1929 |